US010407162B2

(12) United States Patent
Datta

(10) Patent No.: US 10,407,162 B2
(45) Date of Patent: Sep. 10, 2019

(54) MULTICOPTERS WITH VARIABLE FLIGHT CHARACTERISTICS

(71) Applicant: Robodub Inc., Bellevue, WA (US)

(72) Inventor: Suvro Datta, Seattle, WA (US)

(73) Assignee: ROBODUB INC., Bellevue, WA (US)

( * ) Notice: Subject to any disclaimer, the term of this patent is extended or adjusted under 35 U.S.C. 154(b) by 313 days.

(21) Appl. No.: 15/112,386

(22) PCT Filed: Jan. 20, 2015

(86) PCT No.: PCT/US2015/012075
§ 371 (c)(1),
(2) Date: Jul. 18, 2016

(87) PCT Pub. No.: WO2015/109322
PCT Pub. Date: Jul. 23, 2015

(65) Prior Publication Data
US 2016/0340028 A1     Nov. 24, 2016

Related U.S. Application Data

(60) Provisional application No. 62/027,246, filed on Jul. 22, 2014, provisional application No. 61/929,249, filed on Jan. 20, 2014.

(51) Int. Cl.
*B64C 15/12* (2006.01)
*B64C 39/02* (2006.01)
(Continued)

(52) U.S. Cl.
CPC .............. *B64C 15/12* (2013.01); *B64C 27/08* (2013.01); *B64C 27/52* (2013.01); *B64C 39/024* (2013.01);
(Continued)

(58) Field of Classification Search
CPC ......... B64C 15/12; B64C 27/52; B64C 27/08; B64C 39/024; B64C 2201/14;
(Continued)

(56) References Cited

U.S. PATENT DOCUMENTS 3,053,480 A    9/1962  Vanderlip
8,052,081 B2   11/2011 Olm et al.
(Continued)

FOREIGN PATENT DOCUMENTS

| CN | 101973392 A | 2/2011 |
| DE | 10 2005 003 028 A1 | 7/2006 |
| DE | 10 2005 014 949 A1 | 10/2006 |
| DE | 10 2007 054 126 A1 | 5/2009 |
| WO | 2008/147484 A2 | 12/2008 |
| WO | 2011/131733 A2 | 10/2011 |

*Primary Examiner* — Magdalena Topolski
(74) *Attorney, Agent, or Firm* — Seed Intellectual Property Law Group LLP

(57) ABSTRACT

An aircraft (40a) is provided that includes a plurality of arms (41, 42, 43, 44) with selected arms having the ability to either adjust their length, have arm segments operative to move about an articulated joint in two or three dimensions, or have one arm operative to adjust an angle between the one arm and another arm, or any combination of the foregoing. Thrust generators are repositionably mounted on selected arms, and a control system enables automated, on-board, or remote control of the thrust generators, repositioning of the thrust generators on the arms, adjustment in the length of the selected arms, the movement of selected arms about the articulated joints, and adjustment of the angle between two or more arms, all while maintaining directional control of the aircraft in flight or on the ground. The aircraft has operational capabilities that exceed existing designs and facilitates manned and unmanned delivery of cargo and transportation of passengers.

18 Claims, 15 Drawing Sheets

(51) Int. Cl.
  *B64C 27/08*  (2006.01)
  *B64C 27/52*  (2006.01)
  *B64D 27/26*  (2006.01)
  *G05D 1/00*  (2006.01)

(52) U.S. Cl.
  CPC ........... *B64D 27/26* (2013.01); *G05D 1/0011* (2013.01); *B64C 2201/027* (2013.01); *B64C 2201/042* (2013.01); *B64C 2201/108* (2013.01); *B64C 2201/14* (2013.01)

(58) Field of Classification Search
  CPC ........ B64C 2201/108; B64C 2201/042; B64C 2201/027; B64C 15/00; G05D 1/0011; B64D 27/26
  See application file for complete search history.

(56) References Cited

U.S. PATENT DOCUMENTS

| | | | |
|---|---|---|---|
| 8,453,962 B2 | | 6/2013 | Shaw |
| 10,035,591 B2* | | 7/2018 | Apkarian ............ B64C 29/0033 |
| 10,065,726 B1* | | 9/2018 | Phan ...................... B64D 17/80 |
| 2010/0108801 A1* | | 5/2010 | Olm ...................... B64C 39/024 |
| | | | 244/17.23 |
| 2013/0206915 A1 | | 8/2013 | Desaulniers |
| 2014/0339355 A1* | | 11/2014 | Olm ........................ B64C 27/08 |
| | | | 244/17.23 |
| 2017/0158320 A1* | | 6/2017 | Bosch .................... B64C 27/52 |
| 2017/0247107 A1* | | 8/2017 | Hauer ................... B64C 39/024 |
| 2018/0105271 A1* | | 4/2018 | Wypyszynski .......... B64D 1/00 |

* cited by examiner

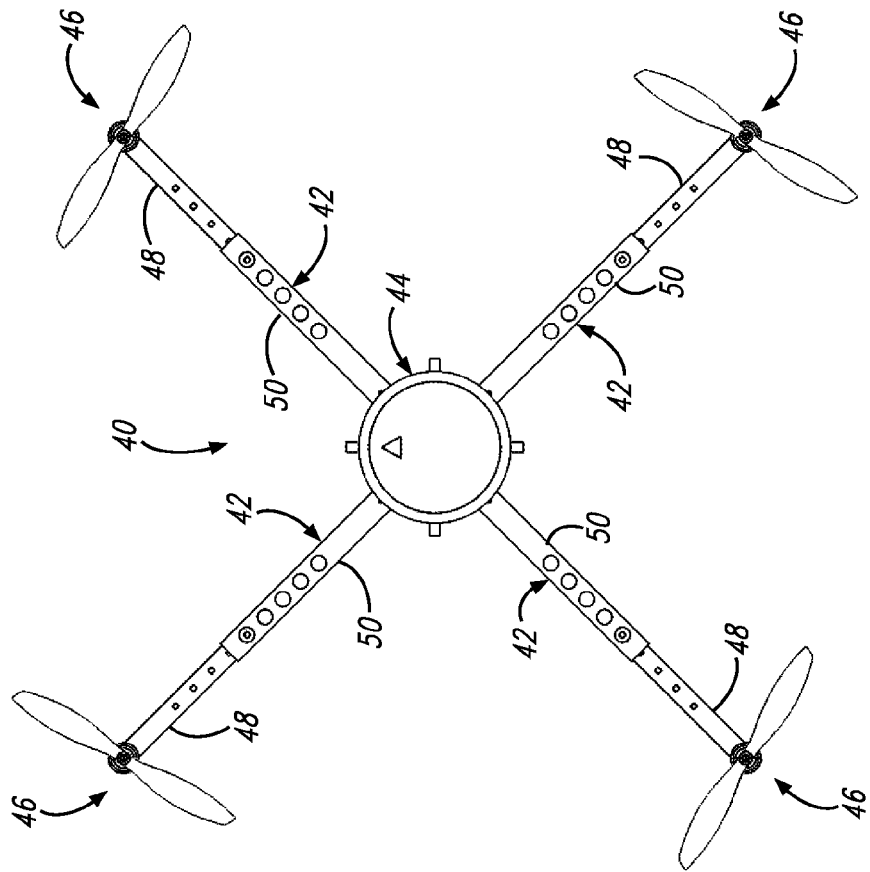
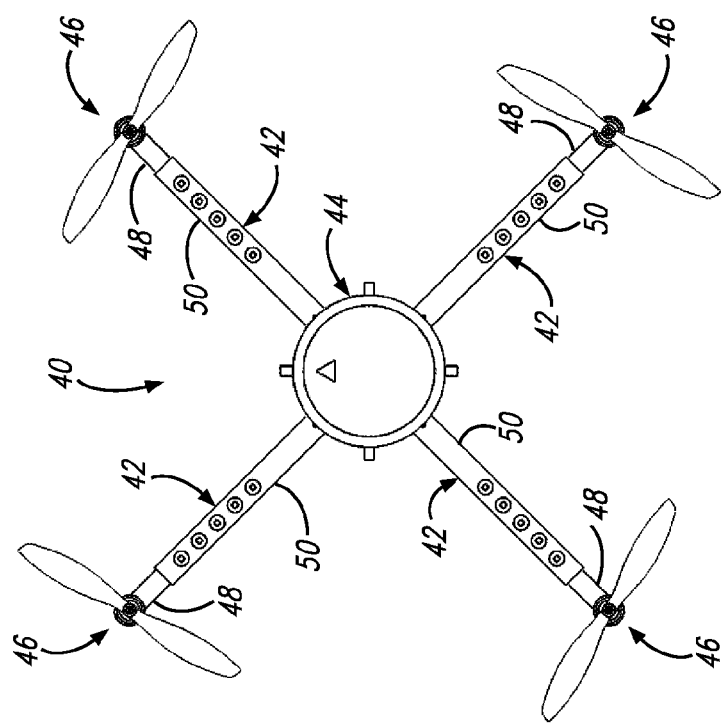
FIG. 4B
FIG. 4A

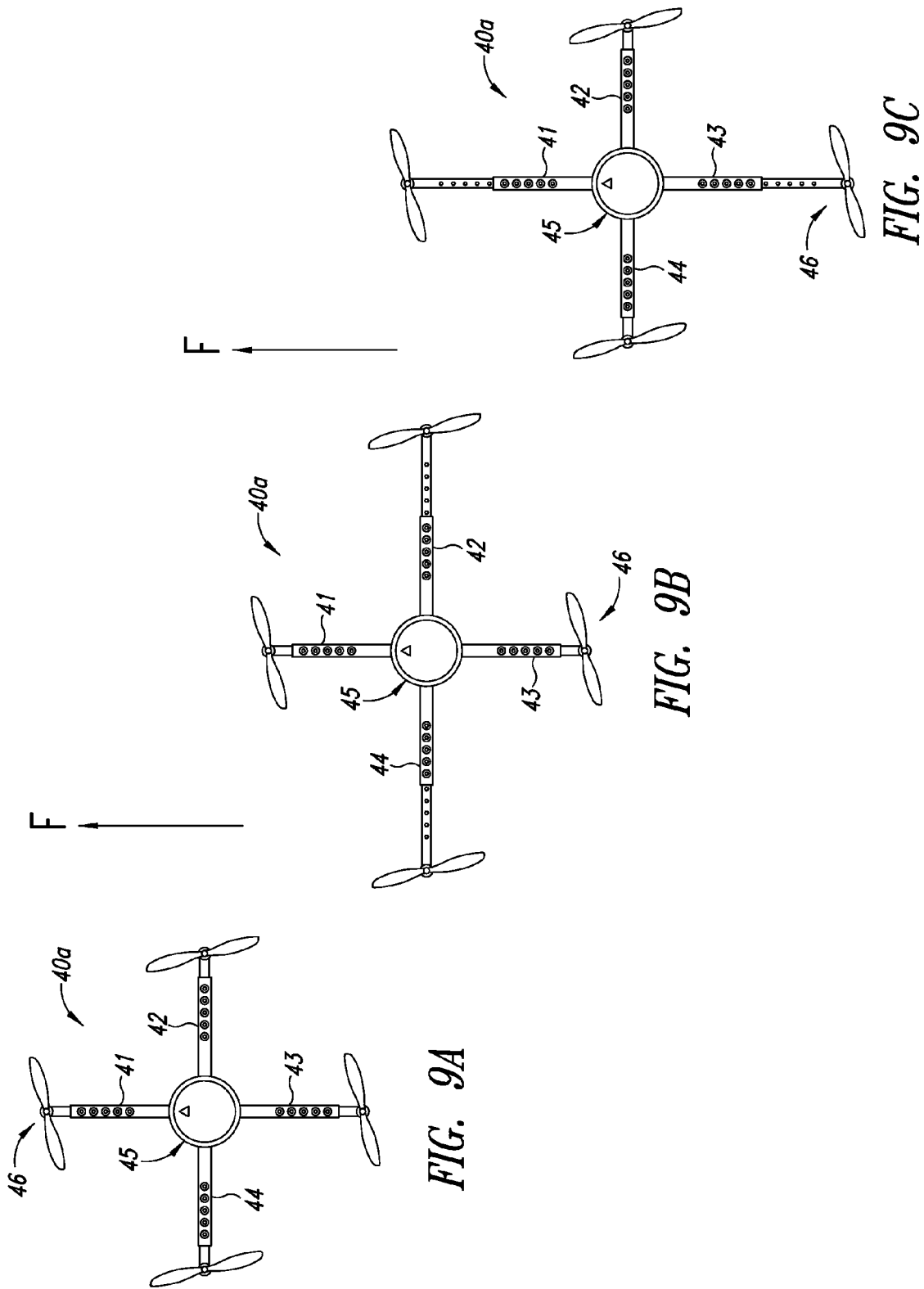

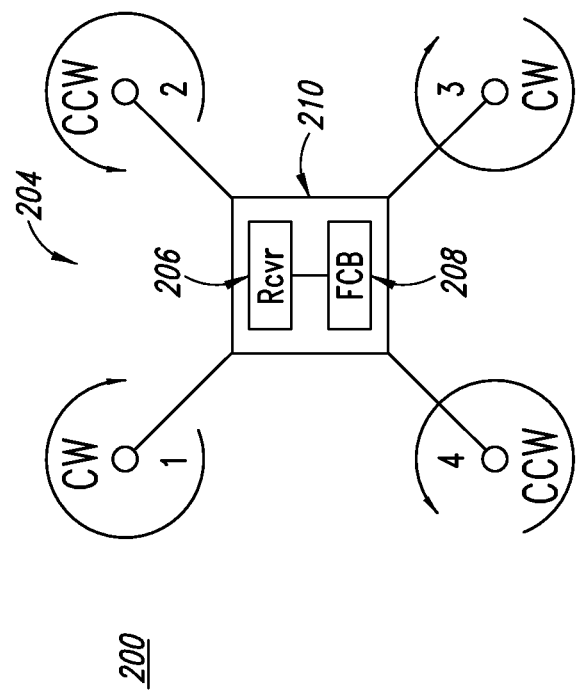
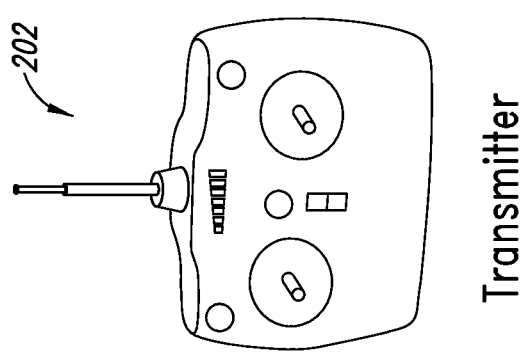
FIG. 14

MULTICOPTERS WITH VARIABLE FLIGHT CHARACTERISTICS

BACKGROUND

Technical Field

The present disclosure is directed to dynamically reconfigurable aerial vehicles and, more particularly, to aircraft having multiple thrust generators that can be repositioned relative to one another while in flight or on the ground and a related control system that maintains in-flight stability during repositioning of the thrust generators.

Description of the Related Art

One form of aircraft that utilizes multiple thrust generators is the multicopter. This type of craft utilizes multiple rotors oriented to have a downward thrust. Typically, these rotors are mounted to a fixed frame, usually multiple arms extending outward from a central hub. Because these craft have inherent dynamic instability, sophisticated control systems are used to vary the amount of thrust produced by each rotor to enable controlled ascent, descent, hovering and directional control.

Referring to FIG. 1, shown therein is a multicopter 20 having four rotors 22 mounted on respective arms 24 that extend from a central hub 26, usually in a symmetric manner. Each arm 24 holds a respective rotor 22 at a terminal end 28. A multicopter can have any number of arms, but the most common type of multicopter is a quadcopter, which has the four arms 24 shown in FIG. 1. A common variation is the tricopter, which has three arms, hexacopter, which has six arms, and the octocopter 30, which has eight arms 32, as shown in FIG. 2.

A quadcopter can be of two types depending how the direction of motion is defined by its controller electronics. There is the "Plus" (+) type where the direction of forward motion is along one of the arms, as shown by the denoted $F_1$ in FIG. 1, and there is the "x" type, where the direction of forward motion is along the middle of two adjacent arms, denoted by $F_2$ in FIG. 1.

Flight control is maintained by an on-board receiver coupled to a control system that combines data from small on-board MEMs gyroscopes, accelerometers (the same as those found in smart phones) and signals received at the on-board receiver from a remote transmitter.

Generally, the rotor spins in an opposite direction from the two rotors on either side of it (i.e. in a quadcopter the rotors on opposite corners of the frame spin in the same direction). A multicopter controls roll and pitch by speeding up the rotors on one side of the craft while slowing down the opposing other rotors. If the user wanted the craft to roll left, the user would input signals that would cause the rotors on the right side of the frame to speed up and the rotors on the left slide to slow down. Similarly if the user intended to move the craft forward, the user would cause the back rotors to speed up and the front rotors to slow down.

The craft turns clockwise or counterclockwise ("yaws" as viewed from the top) by speeding up the set of rotors that spin counterclockwise (or clockwise), and slowing down the other set of rotors that spin clockwise (or counterclockwise). Horizontal motion is accomplished by temporarily speeding up or slowing down some rotors so that the vehicle rolls into the desired direction of travel and increasing the overall thrust of all rotors so the overall thrust vector causes the craft to move in the intended direction. Altitude is controlled by speeding up or slowing down all rotors at the same time.

One drawback to current designs is the difficulty or near impossibility of accommodating for an engine-out situation or for a change in the amount or shift in the location of a load carried by the aircraft. In addition, when the craft is flying within a narrow airspace, whether intentionally or inadvertently, there is the high risk of rotor strike with a ground-based object, such as trees, buildings, and other structures. Hence, there is a need for a multicopter design that facilitates continued stable flight in response to changes in the moment of inertia, center of gravity, and center of mass, such as engine failure or when there is a change in the load. There is also a need for an aircraft that can reconfigure itself while in flight to accommodate clearance with ground-based features.

BRIEF SUMMARY

An aircraft is provided that includes a plurality of arms with selected arms having the ability to either adjust their length, have arm segments operative to move about an articulated joint in two or three dimensions, or have one arm operative to adjust an angle between the one arm and another arm or any combination of the foregoing. In addition, thrust generators are repositionably mounted on selected arms, and a control system enables one or more of automated, on-board, and remote control of the operation of the thrust generators as well as repositioning of the thrust generators on the arms, adjustment in the length of the selected arms, the movement of selected arms about the articulated joints, and adjustment of the angle between two or more arms, all while maintaining directional control of the aircraft in flight or on the ground. The aircraft has operational capabilities that exceed existing designs and facilitates manned and unmanned delivery of cargo and transportation of passengers.

In accordance with one aspect of the present disclosure, an aircraft is provided that includes a frame having a plurality of arms, each arm having a longitudinal axis, a first arm of the plurality of arms operative to adjust a length of the first arm along a longitudinal axis, and the first arm or a second arm of the plurality of arms operative to move about an articulated joint, and at least one arm of the plurality of arms operative to adjust an angle between the at least one arm and at least one other arm of the plurality of arms. The aircraft further includes a plurality of thrust generators, and a control system coupled to the first or second and the at least one of the plurality of arms and to the plurality of thrust generators and operative to control the operation of the plurality of thrust generators, and to control adjustment of the length of the first arm in flight and on the ground while maintaining directional control of the aircraft in flight and on the ground, the control system further operative to control the movement of the first arm or a second arm of the plurality of arms about the articulated joint in flight and on the ground while maintaining stability of the aircraft in flight and on the ground, and to control adjustment of the angle between the at least one arm and the at least one other arm in flight and on the ground while maintaining directional control of the aircraft in flight and on the ground.

In accordance with another aspect of the present disclosure, an aircraft is provided that includes a frame having a plurality of arms, at least one of the plurality of arms operative to adjust a length of the arm along a longitudinal axis to accommodate an asymmetric shift in thrust or load, a plurality of thrust generators, at least one thrust generator mounted on a respective arm of the plurality of arms, and a control system coupled to the at least one of the plurality of arms and to the plurality of thrust generators and operative to control the operation of the plurality of thrust generators and to control adjustment of the length of the at least one of the plurality of arms in flight and on the ground while maintaining directional control of the aircraft in flight or on the ground or both.

In accordance with still yet another aspect of the present disclosure, an aircraft is provided that includes a frame having a plurality of arms, each arm having a longitudinal axis, and at least one arm operative to move about an articulated joint, a plurality of thrust generators, at least one thrust generator mounted on a respective arm of the plurality of arms, and a control system coupled to the at least one arm and to the plurality of thrust generators and operative to control the movement of the at least one arm about the articulated joint in flight and on the ground while maintaining stability and controllability of the aircraft in flight and on the ground.

In accordance with a further aspect of the present disclosure, an aircraft is provided that includes a frame having a plurality of arms, each arm having a longitudinal axis, at least one arm of the plurality of arms operative to adjust an angle between the at least one arm and at least one other arm of the plurality of arms, a plurality of thrust generators, at least one thrust generator mounted on a respective arm of the plurality of arms, and a control system coupled to the at least one arm of the plurality of arms and to the plurality of thrust generators and operative to control the operation of the plurality of thrust generators and to control adjustment of the angle between the at least one arm and the at least one other arm in flight and on the ground while maintaining directional control of the aircraft in flight and on the ground.

In accordance with a further aspect of the present disclosure, an aircraft is provided that includes a frame having a plurality of arms, each arm having a longitudinal axis, a first arm of the plurality of arms operative to adjust a length of the first arm along a longitudinal axis, and the first arm or a second arm of the plurality of arms operative to move about an articulated joint, and at least one arm of the plurality of arms operative to adjust an angle between the at least one arm and at least one other arm of the plurality of arms, a plurality of thrust generators, at least one thrust generator mounted on a respective arm of the plurality of arms, and a control system coupled to the first or second and the at least one of the plurality of arms and to the plurality of thrust generators and operative to control the operation of the plurality of thrust generators and to control adjustment of the length of the first arm in flight and on the ground while maintaining directional control of the aircraft in flight and on the ground, the control system further operative to control the movement of the first arm or a second arm of the plurality of arms about the articulated joint in flight and on the ground while maintaining stability of the aircraft in flight and on the ground, and to control adjustment of the angle between the at least one arm and the at least one other arm in flight and on the ground while maintaining directional control of the aircraft in flight and on the ground.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIG. 4A illustrates a quadcopter with arms contracted,
and FIG. 4B illustrates the arms extended in accordance with the present disclosure;
FIGS. 9A, 9B, and 9C are a top plan view of a "Plus" (+) type quadcopter with three different configurations in which arm extension and contraction is decoupled, all arm lengths equal (FIG. 9A), side arms extended (FIG. 9B), and front and rear arms extended (FIG. 9C);
FIG. 14 is an illustration of a control system formed in accordance with the present disclosure.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with rotors, thrust generators, remote control transmitters and receivers, landing gear, and frame construction for multicopters and in general aircraft and airplanes have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

The present disclosure is intended to be applicable, in principle, to any multicopter with an arbitrary number of arms in general. However, the representative embodiments described and illustrated herein will be directed to a multicopter with four arms, also known as a quadcopter. It is to be further understood that the present disclosed implementations are intended to be used with all forms of known thrust generators for aircraft including, without limitation, propeller and rotary wings as well as all forms of jet engines and other air breathing engines, such as piston, gas generator, turbo jet, turbo fan, turboprop and turbo shaft, and ramjet. In the following detailed description the term "rotor" will be used to designate a preferred form of thrust generator for the representative implementations. The rotor is defined as a propeller coupled to a motor or engine. In the typical case of a quadcopter, the motor is an electric motor typically powered by an external source of electricity, such as a battery. However, solar power, transmitted electromagnetic energy, ambient electromagnetic energy, gasoline or nitro fuel, and other forms of harvested or generated electricity can be used as a power source, which are all known in the art.

Figures 1, 2:
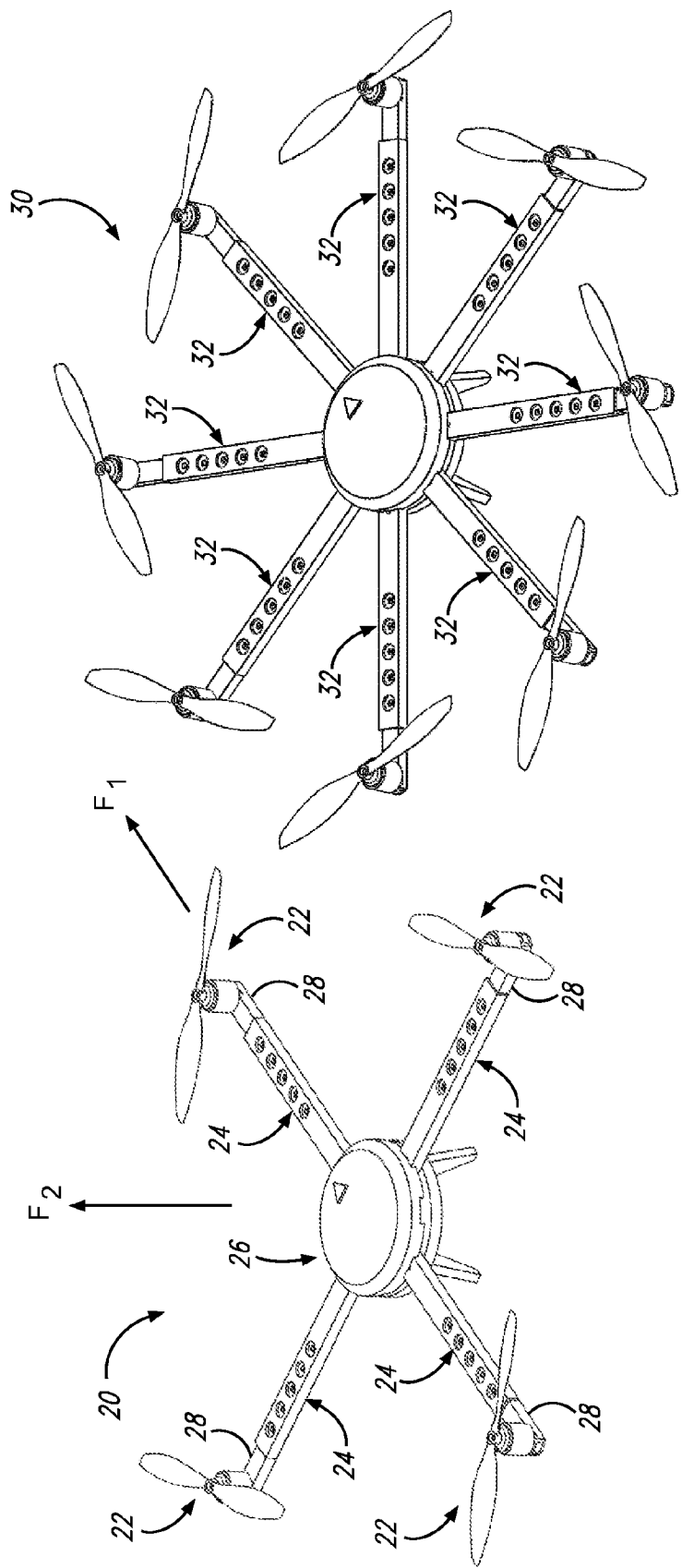
FIG. 1 is an illustration of a known multicopter.
FIG. 2 is an illustration of a known octocopter.
Figure 3:
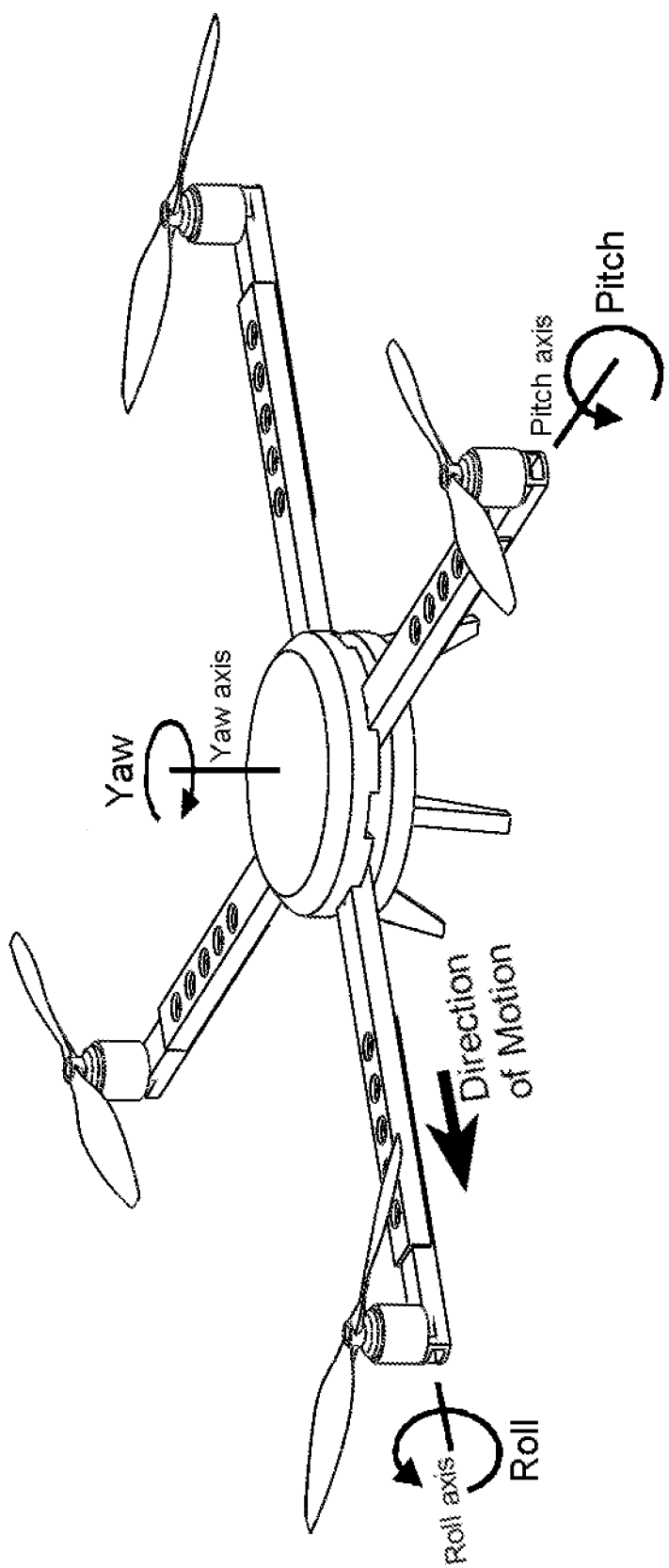
FIG. 3 is an axonometric view of a known quadcopter showing its roll, pitch, and yaw motion and the roll, pitch and yaw axes.

The agility (ability to change its state of motion quickly) or its opposite, stability (ability of holding the current state of motion) of a quadcopter depends on the position of the rotor relative to the center of gravity of the vehicle and its moments of inertia (rotational mass) of the vehicle for the three orthogonal axes, which are (1) Roll axis (2) Pitch axis, and (3) Yaw axis, all shown in FIG. 3, along with the defined direction of motion. In the present disclosure, the agility and stability characteristics are altered by extending and retracting the arms and the attached thrust generators and by moving the arms of the quadcopter in a horizontal plane.

Referring now to the invention in more detail, in FIGS. 4A and 4B there are shown two configurations of a quadcopter 40 having four arms 42 extending from a central hub 44 with thrust generators in the form of rotors 46 mounted on a distal section 48 extending from a proximal section 50 of each arm 42. In FIG. 4A, the arms 42 are shown in a contracted configuration in which the distal sections 48 are contracted within the proximal ends 50. In FIG. 4B, the arms 42 are in an extended configuration in which the distal sections 48 extend out of the proximal ends 50. In the extended configuration of FIG. 4B, there is a greater moment of inertia (I) than in the contracted configuration of FIG. 4A. Hence, in the contracted configuration of FIG. 4A, the vehicle 40 has more agility but may be slightly less stable, while in the extended configuration shown in FIG. 4B, the vehicle 40 has more stability during the flight.

In more detail, let the moment of inertia (rotational mass) about the roll axis be $I_{RA}$, moment of inertia about the pitch axis be $I_{PA}$, and moment of inertia about the yaw axis be $I_{YA}$. The values of these three components $I_{RA}$, $I_{PA}$ and $I_{YA}$ are different in the configuration shown in FIG. 4A than in FIG. 4B.

Figure 11:
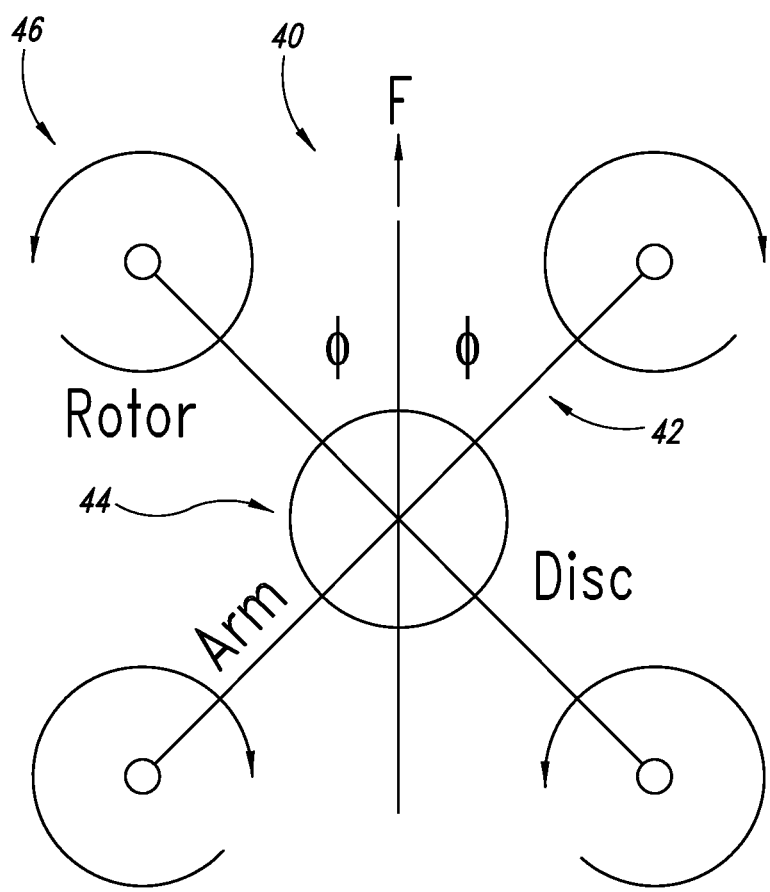
FIG. 11 is a simplified diagram of an X type quadcopter showing four rotors, four arms, and the disc at the center.

Now referring to FIG. 11, and using a simple model of a quadcopter 40 where the center hub 44 is a disc of radius R and mass $M_{disc}$, each of the four identical arms 42 (extending from the center hub 44) has a length of L and mass $M_{arm}$ and each of the four identical rotors 46 has a mass $M_{rotor}$. Uniform mass distribution in the arms is assumed. The arms can extend in length.

The moment of inertia about the Roll axis is $I_{RA}=M_{disc}R^2/4+2M_{arm}(L)^2/3+2M_{rotor}(L)^2$ The moment of inertia about the Pitch axis is $I_{PA}=M_{disc}R^2/4+2M_{arm}(L)^2/3+2M_{rotor}(L)^2$ The moment of inertia about the Yaw axis is $I_{YA}=M_{disc}R^2/2+4M_{arm}(L)^2/3+4M_{rotor}(L)^2$ Now in this simple model, if we expand the arms so that the length L becomes mL (where m is a multiplicative factor) without any change in the mass, then those three components of I become modified as, $I_{RA}=M_{disc}R^2/4+2M_{arm}(mL)^2/3+2M_{rotor}(mL)_2$ $I_{PA}=M_{disc}R^2/4+2M_{arm}(mL)^2/3+2M_{rotor}(mL)^2$ $I_{YA}=M_{disc}R^2/2+4M_{arm}(mL)^2/3+4M_{rotor}(mL)^2$ which shows how the change in length affects all the components of the moment of inertia I.

Let us consider a mid-size quadcopter with some realistic values, L=20 centimeters, $M_{disc}$=400 grams, $M_{arm}$=100 grams, $M_{rotor}$=100 grams. Using the three equations above, this set of values yields $I_{RA}=I_{PA}$=97867 gm·cm², and $I_{YA}$=195734 gm·cm²

Now if we consider a 25% expansion of arm length (m=1.25), then the new values are, $I_{RA}=I_{PA}$=141367 gm·cm², and $I_{YA}$=282734 gm·cm²

This shows that the increase of the arm length decreases the agility and increases the stability and decreases the agility for roll, pitch and yaw motions.

It will be appreciated that various designs can be used to increase or decrease the effective length of the arms, including telescoping referenced above, as well as the use of lead screws, a scissoring mechanism, and the like.

In further details, still referring to the FIGS. 4A and 4B, the extension and contraction of the arms 42 can be done when the quadcopter 40 is on the ground. It can also be devised such that the extension and retraction can be performed remotely or in an automated way while quadcopter 40 is in flight.

Figure 5A:
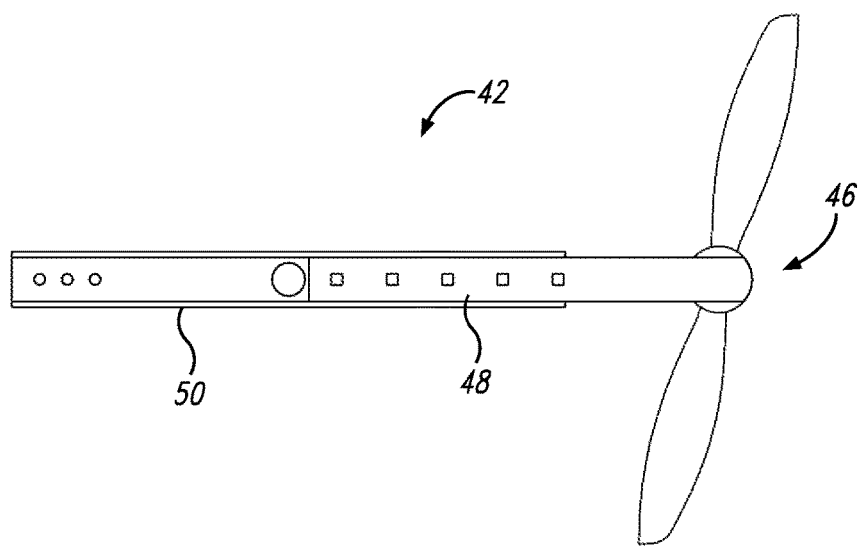
FIGS. 5A and 5B are enlarged bottom views the quadcopter arm of FIGS. 4A and 4B, respectively, illustrating the telescopic extension design formed in accordance with the present disclosure.
Figure 5B:
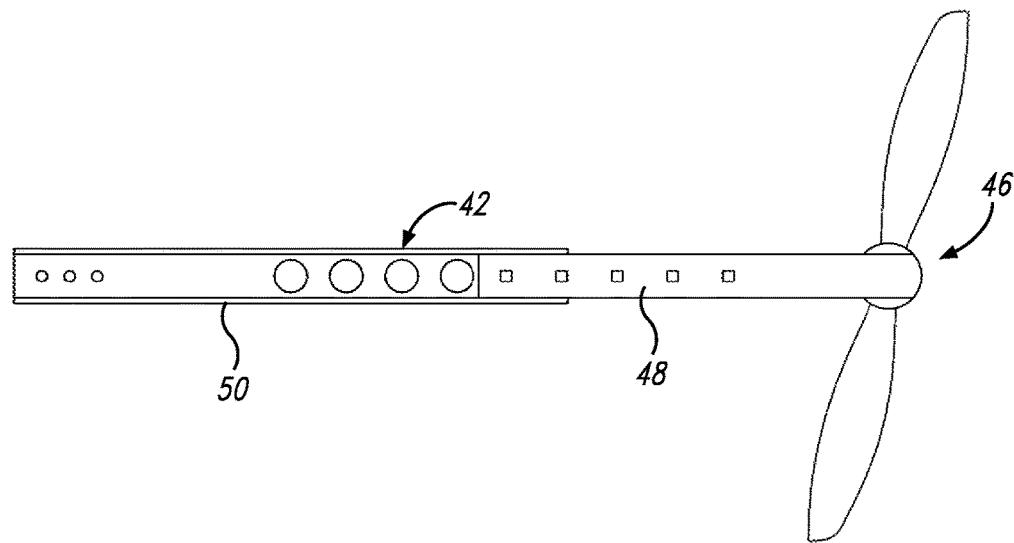

There are a number of possible ways of changing the length of the arms 42 remotely during the flight or on the ground. For example, the arm 42 can be made of a set of telescoping sections 48, 50 as shown in FIGS. 5A and 5B. The distal section 48 can be structured to be slidably received within the proximal section 50 and slid in and out to change the effective length of the arm 42. FIG. 5A shows the arm 42 in the contracted configuration, and FIG. 5B shows the arm 42 in the extended configuration. The distal section 48 may be manually moved or mechanically moved into and out of (or along) the proximal section 50. Manually, the arms 42 can be individually adjusted in their length when on the ground. Bolts, screws, detents, and other known fasteners can be used to retain the distal section 48 in a selected position relative to the proximal section 50. The in-and-out slidable movement can be achieved in various ways, for example, using a lead screw mechanism, a rackand-pinion arrangement, a spring mechanism (either pushed or pulled), pneumatic, hydraulic, electromagnetic, and other known means. This movement is preferably controlled by the control system, which is coupled to the mechanism that changes the length of the arm.

The control of the mechanical movement is preferably done remotely using radio frequency controls signals, which will be described in more detail below. In addition, the onboard control system will compensate for the changing weight moments as needed, which is also described in more detail below. It is to be understood that other forms of communication can be used including, without limitation, Bluetooth and Wi-Fi. Movement can also be done autonomously through a processor coupled to sensors that responds to sense signals from the sensors or with pre-programmed instructions.

Figure 6:
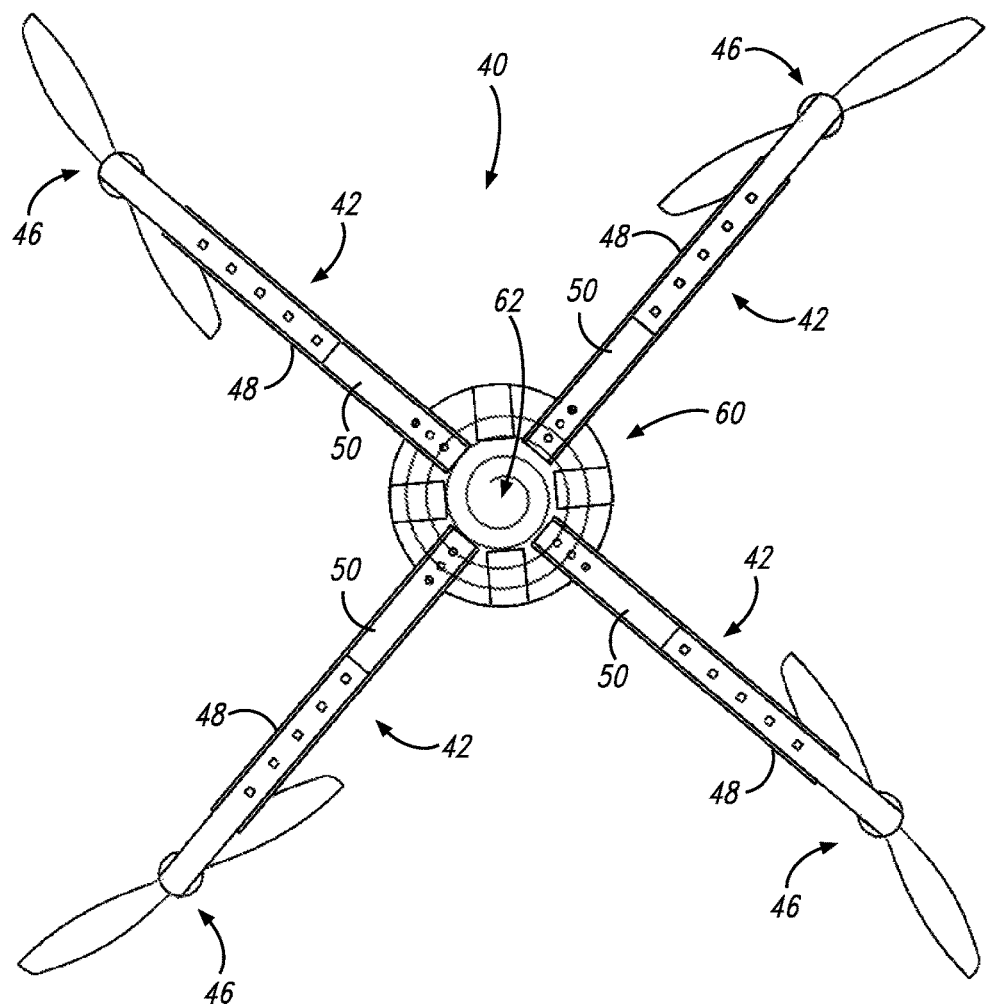
FIG. 6 is a bottom plan view of a spiral mechanism configured to change the effective length of the quadcopter arms in accordance with the present disclosure.

Referring to FIG. 6, shown therein is another mechanism of contracting and extending all the arms 42 simultaneously. A chuck-spiral mechanism 60 is utilized in which a spiral grooved wheel 62 will contract and extend the arms 42 in response to the wheel turning clockwise/counterclockwise. Because the chuck-spiral mechanism is known in the art, it will not be described in greater detail.

Figure 7A:
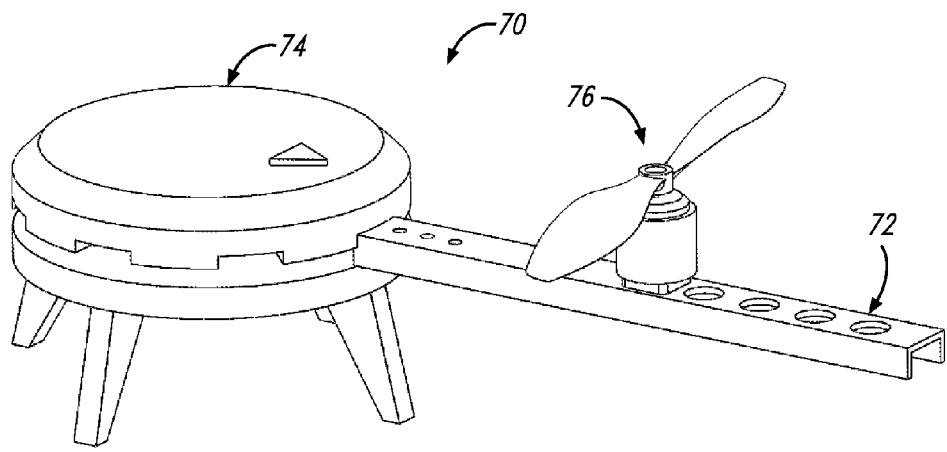
FIGS. 7A and 7B are axonometric views of a quadcopter arm illustrating multiple positions for mounting a rotor on an arm in accordance with the present disclosure.
Figure 7B:
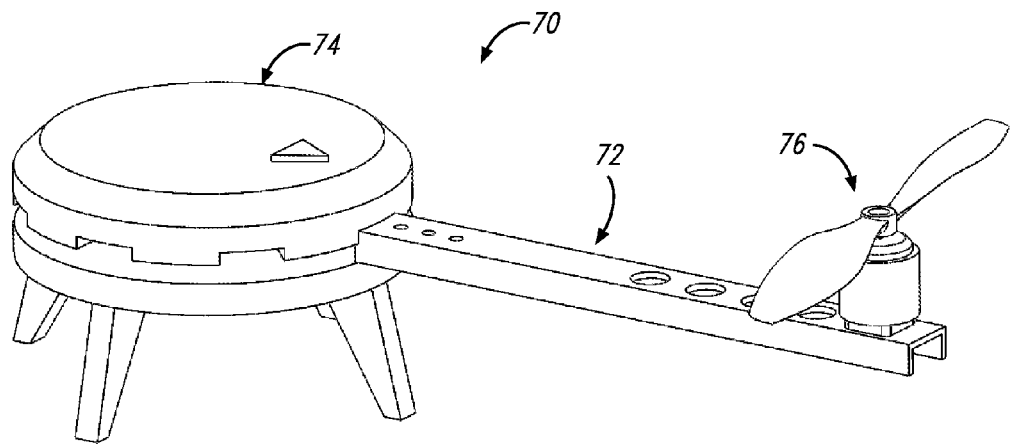

Referring now to FIGS. 7A and 7B, another way of changing the agility and stability of a quadcopter 70 is illustrated. Here, the quadcopter 70 has an arm 72 extending from a hub 74 (only one arm is shown for simplicity). The rotor 76 is mounted on the arm 72 in a manner that enables changing the location of the rotor 76 on the arm 72. If the rotor 76 is mounted closer to the center hub 74 of the quadcopter 70 (FIG. 7A), it will have a lower agility than when mounted further along the length of the arm 72 (FIG. 7B).

Figure 8A:
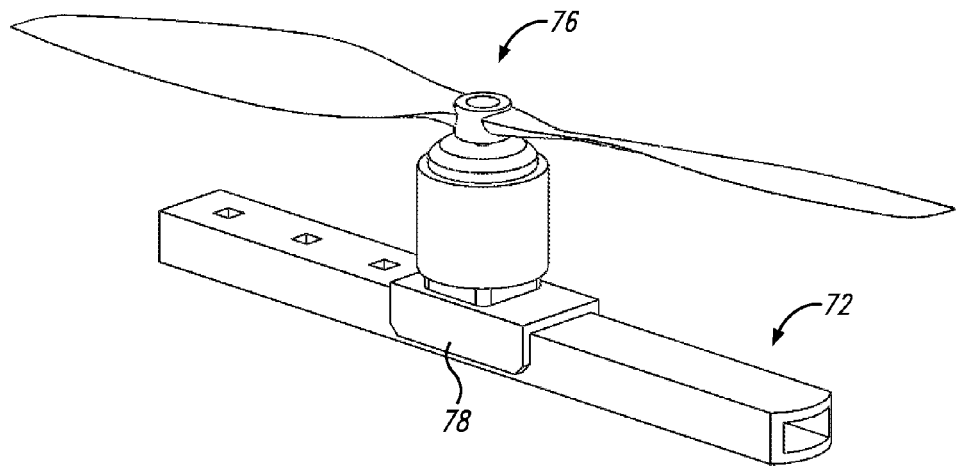
FIGS. 8A and 8B are axonometric views of a quadcopter arm illustrating slidable mounting of the rotor mount on a multicopter arm in accordance with the present disclosure.
Figure 8B:
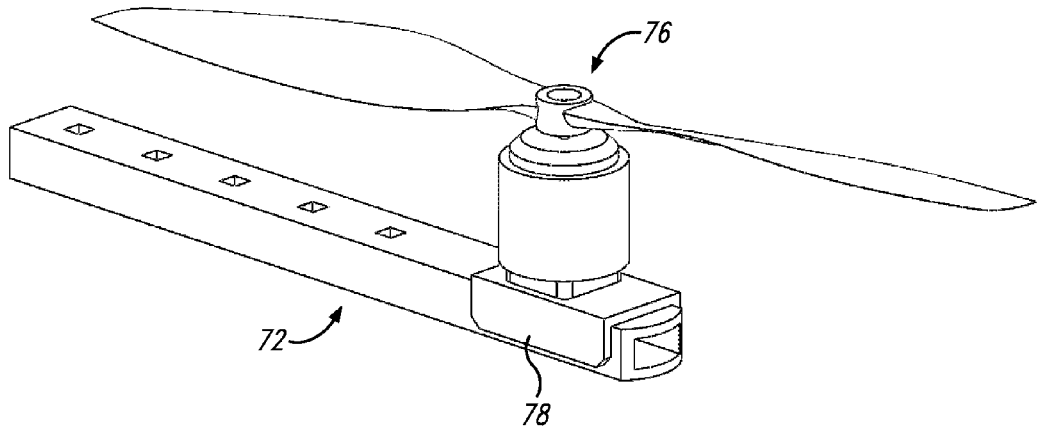

The rotor 76 can be mounted in a few predefined fixed locations along the arm 72 as shown in FIG. 7A using suitable and well-known fastening means. This requires manual relocation of the rotor 76 when it is on the ground. Alternatively, the rotor 76 or can be put on a movable mount 78 that can slide along the arm 72 as shown in FIGS. 8A and 8B. The rotor 76 can be fixed at any location along the arm, as discussed above with respect to FIGS. 7A and 7B. Again, the change of the rotor location can be performed on the ground or remotely during the flight. The movement of the thrust generator or movable mount 78 can be achieved in various ways, for example, using a lead screw mechanism, a rack-and-pinion arrangement, a spring mechanism (either pushed or pulled), pneumatic, hydraulic, electromagnetic, and other known means, all of which are preferably controlled by the control system. The control system that maintains stability while changing the rotor position on the arm during flight is described in more detail below.

Referring now to FIGS. 9A-9C, more control over the flight characteristics can be achieved when the extension of the four arms of the quadcopter can be decoupled. For example, here for a plus (+) type quadcopter 40a, shown in FIG. 9A, the arms 41, 42, 43, and 44 are at equal length from the hub 45. The rotors 46 are thus positioned at the same distance from the hub 45 and from each other. In FIG. 9B, the two side arms 42, 44 are extended and the front and rear arms 41, 43 remain contracted so that the respective rotors are no longer equidistantly spaced. There will thus be increased stability and less agility for roll operations (stability against sideways movement) if the direction of movement is forward (F). On the other hand, if the front and rear arms 41, 43 only are extended and the right and left arms 42, 44 remain contracted, as shown in FIG. 9C, then the quadcopter 40a will have more stability and less agility for pitch operation (stability against forward and backward movement).

In the same manner, instead of changing the length of the arms, the location of the rotors on the arms can be changed in order to achieve the same effects. By moving the rotor locations on the side arms a user can change the stability and agility of the roll operation. By moving the rotor locations on the front and back arms a user can change the stability and agility of the pitch operation.

This implementation of the present disclosure has a number of advantages, first and foremost of which is the ability of changing the agility and stability of the quadcopter, since there are situations where either is desired. Examples of situations where a greater stability is desired: (1) A novice learning how to fly a quadcopter, (2) Aerial photography or videography, (3) Navigating through crowded space, for example, an area with trees and other tall structures. Examples of situations where a greater agility is desired: (1) Aerobatics, (2) Fun flying with fast movements, (3) For having a better control against changing wind, (4) Quick turning (yaw).

Besides the above advantages, the present implementation, with its ability of extending and contracting the arms and moving the location of the rotors on the arms, will also allow the user (1) to make the quadcopter more compact for carrying; (2) to have a better chance of freeing the quadcopter remotely if it gets caught in tree branches or cables during a flight; and (3) to have the ability of moving quadcopter parts out of the field of view for wide-angle photography and videography.

It will be understood that the foregoing implementation in a quadcopter, which has adjustable length aims or adjustable rotor position, thus allowing the change of its stability/agility, can be performed either remotely during the flight or in between flights and can be applied to all multicopter configurations. Moreover, these implementations may be combined or used individually.

Figures 10A, 10B, 10C:
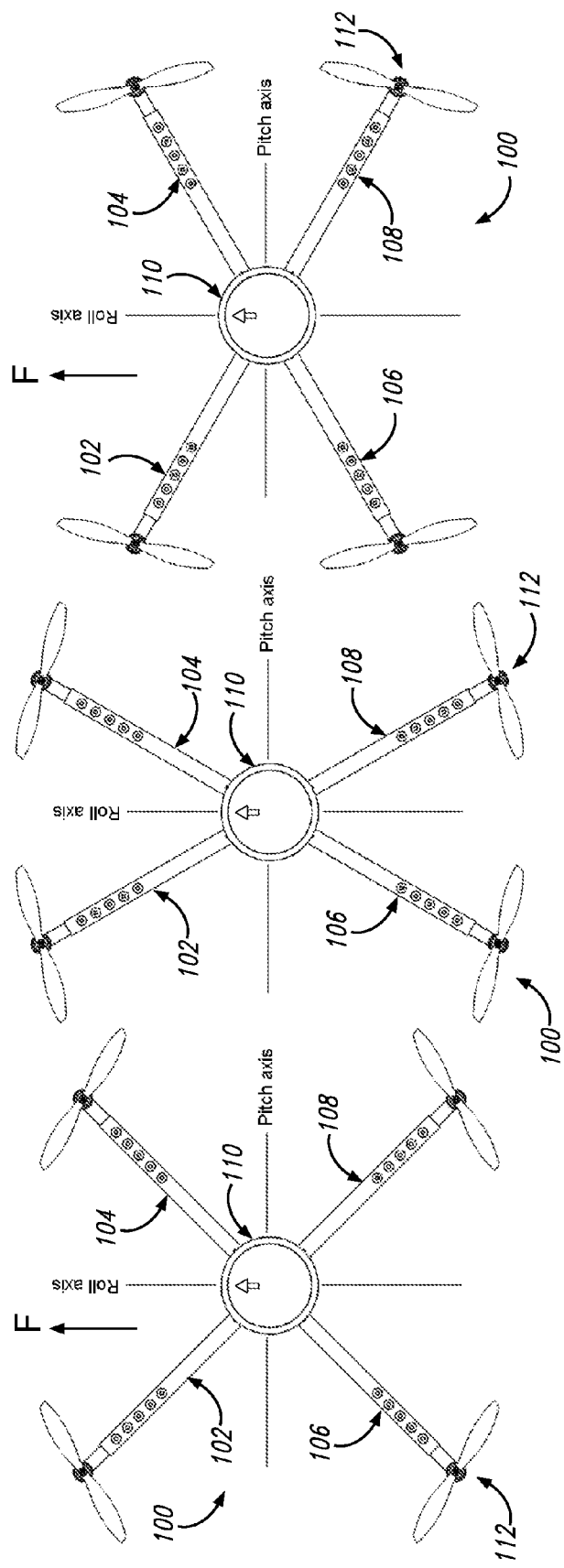
FIGS. 10A-10C are top plan views of an X type quadcopter with arms in a normal position (FIG. 10A), the forward and rearward arms in a narrow position (FIG. 10B), and forward and rearward arms in a wide position (FIG. 10C)

In another implementation of the present disclosure, the angle of the arms relative to one another can be changed by mounting the arms to the central hub to enable pivotal movement of the arms relative to the hub. Referring to FIGS. 10A-10C, there are shown three configurations of a quadcopter 100 having four arms 102, 104, 106, 108 extending from a central hub 110 and having rotors 112 mounted on the distal section of each arm 102, 104, 106, 108. As shown in FIGS. 10A-10B, the forward motion is illustrated as F, in which the two arms 102 and 104 located forward of the pitch axis are the left and right forward arms, and in which the two arms 106, 108 rearward of the pitch axis are the left and right rearward arms respectively. In FIG. 10A the arms 102, 104, 106, 108 are in a normal position or configuration. In FIG. 10B a modified position is shown with the forward arms 102, 106 moved towards each other and coming closer to the roll axis, and the rearward arms 106, 108 likewise are moved toward each other and closer to the roll axis. In FIG. 10C, the opposite movement has occurred, and in this modified position the left forward and rearward arms 102, 106 are moved towards each other, coming closer to the pitch axis, and similarly the right forward and rearward arms 104, 108 are moved towards each other, coming closer to the roll axis. Movement can be achieved in various ways, for example, using a lead screw mechanism, a rack-and-pinion arrangement, a spring mechanism (either pushed or pulled), pneumatic, hydraulic, electromagnetic, and other known means. Preferably the movement is controlled by the controller coupled to the mechanism for moving the arms.

Let the moment of inertia be I (rotational mass) about the roll axis as $I_{RA}$, moment of inertia about the pitch axis as $I_{PA}$, and moment of inertia about the yaw axis as $I_{YA}$. The value of $I_{RA}$ and $I_{PA}$ are different in configurations shown in FIGS. 10B and 10C than in the configuration of FIG. 10A. Hence they have different flight characteristics than the configuration of FIG. 10A. For the configuration of FIG. 10B, pitch agility is less than the configuration of FIG. 10A, and roll agility is greater than the configuration of FIG. 10A. For the configuration in FIG. 10C, the pitch agility is greater than the configuration in FIG. 10A, and roll agility is less than the configuration in FIG. 10A. Yaw agility is not affected by this change of configuration, and is the same for all the three configurations.

Now referring to FIG. 11, and using a simple model of a quadcopter 40 where the center hub 44 is a disc of radius R and mass $M_{disc}$, each of the four identical arms 42 (extending from the center hub 44) has a length of L and mass $M_{arm}$ and each of the four identical rotors 46 has a mass $M_{rotor}$. Uniform mass distribution in the arms is assumed. The arms can move a rotational motion in a 2-dimensional plane with the axis of rotation coincident with the yaw axis. In this simple model the configuration is symmetric about the roll axis, and the arms form an angle of φ with the roll axis.

The moment of inertia about the Roll axis is $$I_{RA}=M_{disc}R^2/4+4M_{arm}(L \sin \varphi)^2/3+4M_{rotor}(L \sin \varphi)^2$$

The moment of inertia about the Pitch axis is $$I_{PA}=M_{disc}R^2/4+4M_{arm}(L \cos \varphi)^2/3+4M_{rotor}(L \cos \varphi)^2$$

Referring back to FIGS. 10A-10C, considering a realistic situation where $M_{disc}$=400 gram, $M_{arm}$=100 gram, and $M_{rotor}$=100 gram, R=6 cm, and L=20 cm; we get $$I_{RA}=3600+213333(\sin \varphi)^2$$

$$I_{PA}=3600+213333(\cos \varphi)^2$$

For φ=45 deg (normal quadcopter configuration, FIG. 4A), this yields:

$$I_{RA}=110266 \text{ gm·cm}^2$$

$$I_{PA}=110266 \text{ gm·cm}^2$$

For φ=30 deg (narrow configuration, FIG. 4B), this yields:

$$I_{RA}=56933 \text{ gm·cm}^2$$

$$I_{PA}=163600 \text{ gm·cm}^2$$

This shows that by changing φ from 45 to 30 degrees, we get a ~48% decrease of $I_{RA}$ and a ~48% increase of $I_{PA}$. In other words, it increases the roll agility (reduces the roll stability) and reduces the pitch agility (increases the pitch stability).

Similarly, for φ=60 deg (wide configuration, FIG. 4C), this yields:

$$I_{RA}=163600 \text{ gm·cm}^2$$

$$I_{PA}=56933 \text{ gm·cm}^2$$

This shows that by changing φ from 45 to 60 degrees, we get a ~48% increase of $I_{RA}$ and a ~48% decrease of $I_{PA}$. In other words, it reduces the roll agility (increases the roll stability) and increases the pitch agility (reduces the pitch stability).

In further details of the mechanism, still referring to the implementation of FIGS. 10A-10C, the change of configuration of the arms can be done when the quadcopter is on the ground. It can also be devised such that the change of configuration can be performed remotely or in an automated way while quadcopter is in flight.

The arms can be independent of each other and configured to rotate in response to actuation of servo motors. There are a number of possible ways of changing the angle of the arms, including but not limited to: (1) Servo motors attached to individual arms that can be controlled remotely; (2) one motor is placed between the two forward arms 102, 104, which will pull together the otherwise spring-loaded arms. There will be another identical motor for the rearward arms 106, 108; (3) a hand cranked version that can be adjusted on ground; and (4) a ball-and-indent or ball-and-detent type mechanical arrangement for moving the arms by hand to predetermined locations.

Figure 12B:
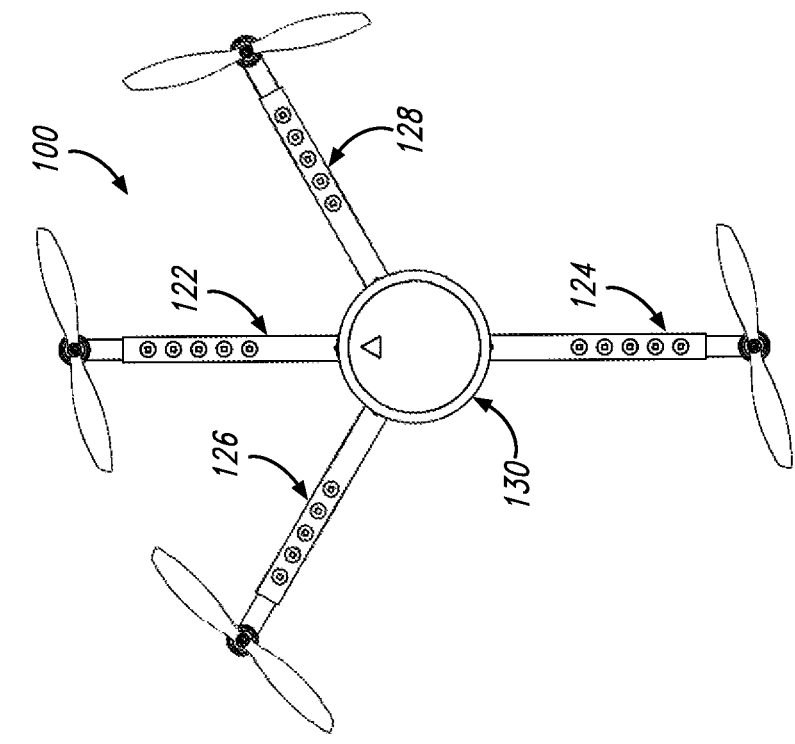
FIGS. 12A and 12 B are top plan views of a Plus (+) type quadcopter with arms in a normal position, and then the two side arms in a narrow position in the same forward direction, respectively.
Figure 12A:
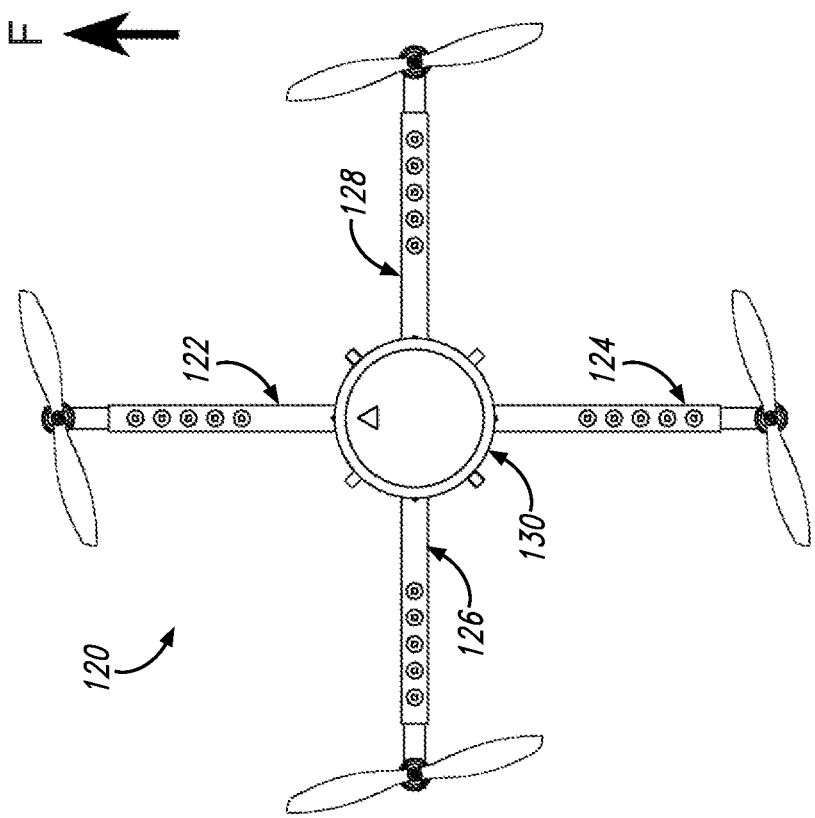

Variations of this technique of changing the quadcopter configuration are also possible. For example, the rotation of the arms can be about an axis that is parallel to (but not coincident with) the yaw axis. Also, the configuration need not be perfectly symmetric, and the angle φ with the roll axis can be different for individual arms. Another possible variation is illustrated in FIGS. 12A-12B using the plus (+) type quadcopter 120 having a forward arm 122, a rearward arm 124, and left and right side arms 126, 128, extending from a central hub 130. Forward motion is depicted with F as shown. For a standard quadcopter configuration shown in FIG. 12A, both the side arms 126, 128 are moved forward into a new configuration in FIG. 12B, thus increasing the roll agility, and moving the center of gravity forward at the same time. This technique may be useful if the original center of gravity is somewhat off-centered that needs to be corrected.

Figure 13B:
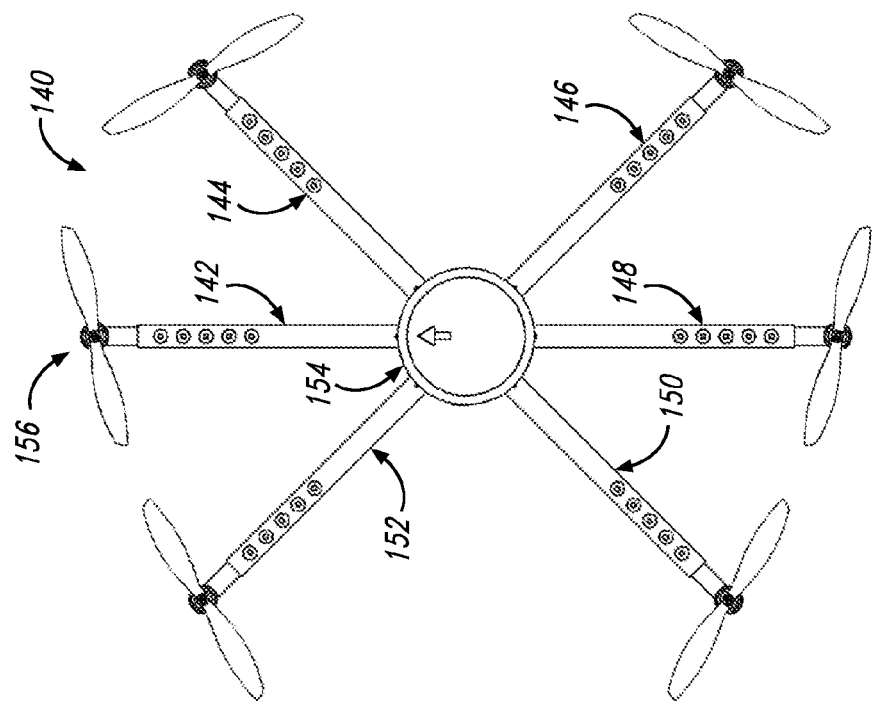
FIGS. 13A and 13B are a view of a hexacopter with arms in a normal position, and the arms in a narrow position, respectively.
Figure 13A:
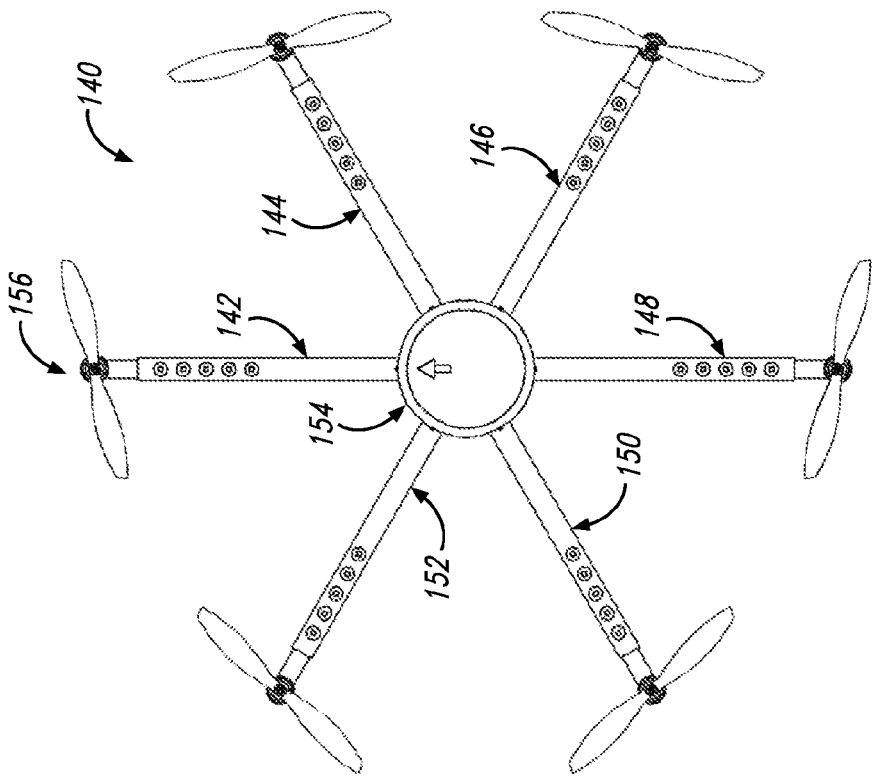

Referring next to FIGS. 13A and 13B, the same principle and techniques described before can also be used for other type of multicopters. A hexacopter 140 is shown here in two configurations having six arms 142, 144, 146, 148, 150, 152 extending from and central hub 154 and having a rotor 156 at the distal section of each arm 142, 144, 146, 148, 150, 152. In FIG. 13A, the normal configuration with equal angles between the adjacent arms (with the direction and motion is along the forward arm 142), and in FIG. 13B, a modified configuration where the two angled forward arms 152 and 144 have moved closer to the forward arm 142, and corresponding rearward angled arms 150 and 146 have moved closer to rear arm 148. This results to a higher value of $I_{PA}$ (moment of inertia about the pitch axis) and a lower value of I (moment of inertia about the roll axis).

The present disclosed implementation has significant advantages over the conventional design of multicopters. First and foremost of which is the ability of changing the agility and stability in the pitch and roll directions.

Examples of situations where a greater overall stability is desired and where the normal configuration (FIG. 10A) could be used: (1) A novice learning how to fly a quadcopter, (2) Aerial video or photography, and (3) an asymmetrical shift in the thrust or the load.

Examples of situations where narrow configuration (FIG. 10B) could be used (1) Navigating through crowded space, (for example, an area with trees and other tall structures) since this configuration has a narrow width. (2) Where more pitch agility (sideways agility) is desired (aerobatic sideways flip, for instance).

Examples of situations where wide configuration (FIG. 10C) could be used: (1) Where more roll agility (front/back agility) is desired (aerobatic head flip, for instance). (2) For having a better control against changing head-wind or tail-wind.

Secondly, the present disclosure is fairly easy to implement using mechanical or electromechanical techniques and tools.

Besides the above main advantages, the present invention, with its ability of moving the arms sideways will also allow the user (1) to make the quadcopter more compact for carrying or fitting it a narrow space; (2) a better chance of freeing the quadcopter remotely if it gets caught in tree branches or cables during a flight; (3) having a bigger field of view of a mounted camera by moving the arms out of the way appropriately; and (4) the ability of moving the center of gravity back and forth along any direction by adjusting the individual arm angles differently, a feature that can be very useful when a payload mounted on the quadcopter is somewhat off-centered or shifts during flight.

FIG. 14 illustrates a control system 200 for the implementations described above. The control system 200 includes a remote transmitter 202 and a multicopter 204 with an on-board receiver 206 and Flight Control Board (FCB) 208.

The quadcopter designs described above can be flown using the foregoing Remote Control (R/C) Transmitter 200, receiver 206, and FCB 208. The transmitter 200 is operated by the user on ground. The receiver 206 and FCB 208 are located on the vehicle, typically near or in the center hub 210. These are readily available components and will not be described in greater detail herein.

In use, the operator uses the transmitter 200 to send out basic four commands: (1) Pitch, to go forward/backward, (2) Roll, to go sideways, (3) Yaw, to turn the body clockwise or counterclockwise, and (4) Throttle, to move up/down. There four commands are sent via four radio channels. Usually, joysticks are used for operator input as shown that.

The receiver 206 receives those commands via radio transmission and sends them directly to inputs on the FCB 208. The FCB 208 is loaded with the flight control software, which processes the input signals (pitch, roll, yaw, and throttle), and accordingly sends control signals to the four (or six for hexacopter or eight for octocopter) rotors individually. Below is a block diagram:

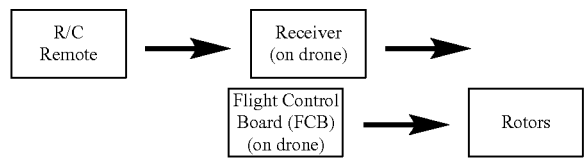

For example, if a Pitch command is sent to move forward, then the FCB 208 spins up rotors 3 and 4, and spins down rotors 1 and 2. The net effect is the craft will tilt forward and move along that direction.

Similarly, if a Yaw command is sent, then the FCB 208 spins down the rotors 1 and 3, and spins up rotors 2 and 4. The net effect is to turn the craft clockwise.

This type of FCB is considered a standard accessory for multirotors and drones. There are several companies that make them. Some of them contain only basic sensor components like gyros, while other also contain 3-axis accelerometers and more, like barometer, magnetometer. More advanced ones have options for connecting GPS and similar positioning devices. Some also offers the option of customizing the flight control software.

The preferred control system for the aircrafts mentioned here is based upon physical models using Lagrangian dynamics. Control parameters for generation of these models would be the thrust of the motor, the length of each arm, the position of the rotor on the arms, and the angle between the arms. The software on-board, which is run by a microprocessor, computer, ASIC, or microchip adjusts these control parameters in mid-flight to fly the craft in optimum possible way. Sensors on the FCB, such as accelerometers or other known sensing devices, such as gyroscopes, altimeters, airspeed indicators, etc., are mounted on the FCB or on the exterior of the hub or the arms, as needed, in order to generate sensing signals to the controller on the FCB, which are then processed as described above to generate control signals.

Figure 15A:
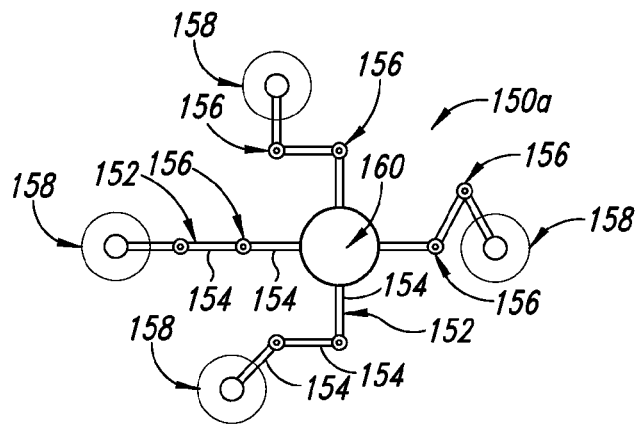
FIGS. 15A-15C illustrate various configurations of articulated arms formed in accordance with the present disclosure.
Figure 15B:
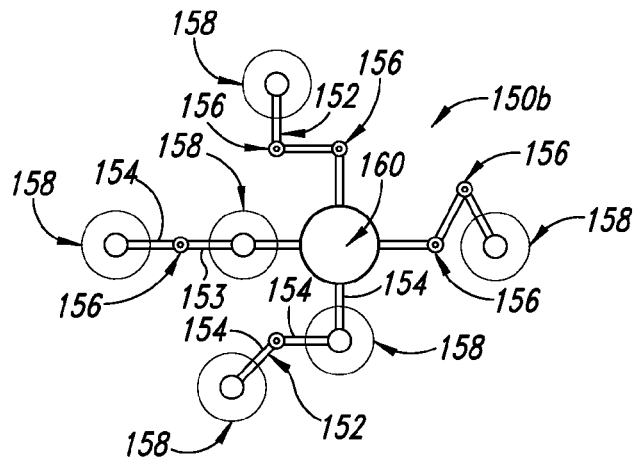
Figure 15C:
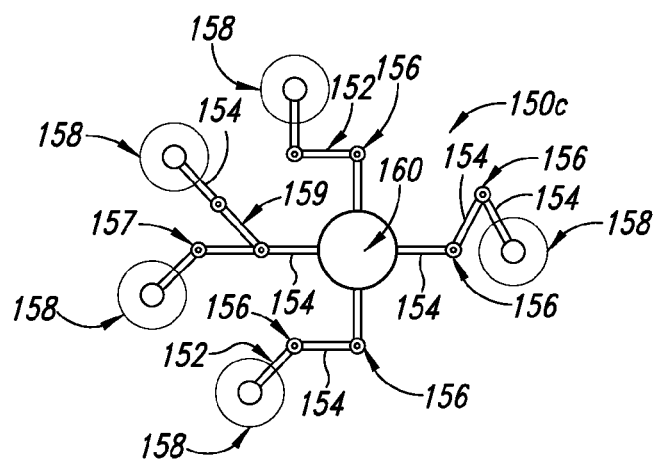

FIGS. 15A-15C illustrate the concept of a quadcopter 150a, 150b, 150c, respectively, having articulated arms 152. The arms 152 can have an arbitrary number of identical or non-identical segments 154 of any shape, connected with rotary joints 156, as shown in FIG. 15A. One or more arms 153 can have multiple rotors 158, depicted in FIG. 15B. In addition, one or more arms 157 can also be branched to have segments 154 or entire articulated arms 159 extending therefrom as shown in FIG. 15C. While a central hub 160 is shown in this implementation, it is to be understood that the central hub 160 can be eliminated and the receiver and FCB mounted within or on one of the arms 152.

Figure 16:
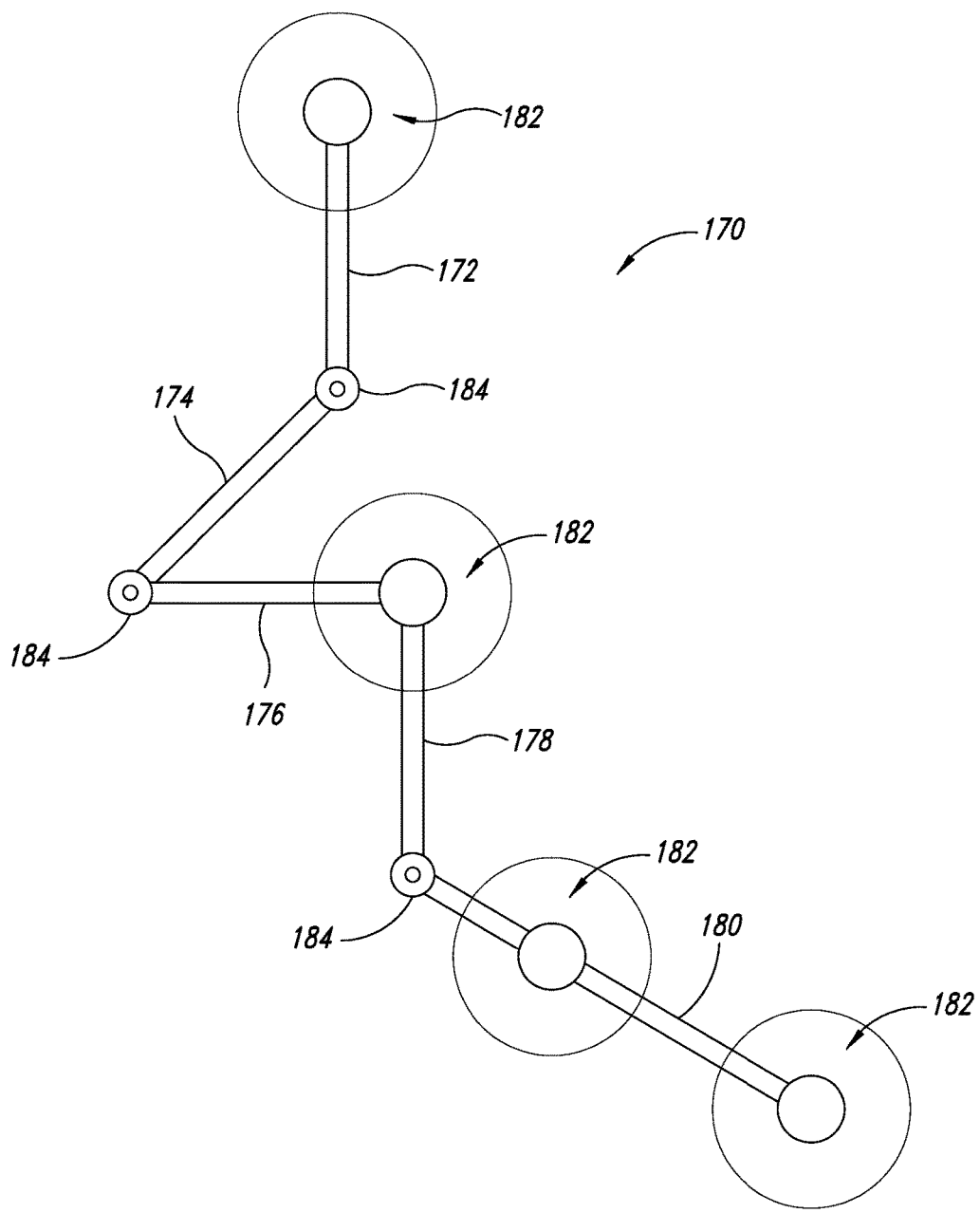
FIG. 16 illustrates a multicopter without a central hub and with articulated arm segments formed in accordance with the present disclosure.

FIG. 16 illustrates yet another implementation of a multicopter 170 in which a central hub is missing. In this design, the multicopter 170 has a plurality of arm segments 172, 174, 176, 178, and 180 coupled together with articulated joints 184. Ideally the articulated joints 184 maintain the arm segments 172, 174, 176, 178, and 180 in a single plane by providing for rotation about a single axis. However, it is within the scope of this disclosure to utilize articulated joints that enable movement within three degrees of freedom, such as a ball joint, in which the arm segments 172, 174, 176, 178, and 180 can move in three dimensions instead of two. A plurality of rotors 182 are provided along selected arm segments 172, 176, 178, and in the case of arm segment 180 there are two rotors 182. The receiver and FCB (not shown) would be mounted or integrated into one or more of the arm segments 172, 174, 176, 178, and 180.

The implementation in FIG. 16 provides a vehicle that can change its shape dynamically (in the air) or while on the ground to accommodate different terrain or terrain features, as well as buildings, bridges, antenna, and other natural and man-made structures. It also enables response to changes in thrust, load, and external conditions, such as wind.

The foregoing implementations can have a variety of uses in both manned and unmanned (drone) applications including, without limitation, scientific research, law enforcement and military deployment, cargo delivery and passenger transport services, and as toys for amusement and education. Although no landing gear, fuselage, cargo container, or passenger compartment has been illustrated or described in conjunction with the instant implementations, one of ordinary skill in this technology can utilize known designs and commercially available components to design and add these features on the described aircraft.

The various embodiments described above can be combined to provide additional implementations. Aspects of the implementations can be modified, if necessary, to employ concepts of the various patents, applications and publications to provide yet further implementations. Thus, it will be understood that the implementations described herein can be combined in multiple ways or used individually. For example one version could have extendable arms used in combination with adjustable angle arms or with movable thrust generators, or with both of these features, or with the articulated arms or a combination of all of these features. This applies equally well to the adjustable angle feature, the movable thrust generators, and the articulated arms.

U.S. provisional patent application Ser. No. 61/929,249 filed Jan. 20, 2014 and U.S. provisional patent application Ser. No. 62/027,246 filed Jul. 22, 2014, are incorporated herein by reference, in their entirety.

These and other changes can be made to the described implementations in light of the foregoing detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the foregoing disclosure.

The invention claimed is:

1. An aircraft, comprising:
a frame having a yaw axis and a plurality of arms, each arm of the plurality of arms attached to the frame at a respective joint and extending radially outward relative to the yaw axis, each arm having a longitudinal axis, a first arm of the plurality of arms operative to adjust a length of the first arm along the longitudinal axis, and the first arm or a second arm of the plurality of arms operative to move rotationally in only a two-dimensional rotational plane orthogonal to the yaw axis, and at least one arm of the plurality of arms operative to adjust an angle phi between the at least one arm and at least one other arm of the plurality of arms only in the rotational plane;
a plurality of thrust generators, at least one thrust generator mounted on a respective arm of the plurality of arms; and
a control system coupled to the first or second arms and the at least one arm of the plurality of arms and to the plurality of thrust generators and operative to control the operation of the plurality of thrust generators and to control adjustment of the length of the first arm in flight and on the ground while maintaining directional control of the aircraft in flight and on the ground, the control system further operative to control the movement of the first arm or the second arm of the plurality of arms about the joint in flight and on the ground while maintaining stability of the aircraft in flight and on the ground, and to control adjustment of the angle phi between the at least one arm and the at least one other arm in flight and on the ground while maintaining directional control of the aircraft in flight and on the ground.

2. The aircraft of claim 1 further wherein the first arm or the second arm of the plurality of arms comprises multiple articulated segments coupled together at respective joints that enable movement of each articulated segment only in the rotational plane, and the control system is coupled to the multiple articulated segments and operative to control movement of the articulated segments in flight and on the ground while maintaining directional control of the aircraft in flight and on the ground.

3. The aircraft of claim 1 wherein at least one of the thrust generators is mounted on a respective arm of the plurality of arms to be repositionable and move along the longitudinal axis of the arm, and the control system is operative to control movement of the at least one thrust generator along the respective arm in flight while maintaining directional control of the aircraft.

4. The aircraft of claim 3 wherein the at least one thrust generator is slidably mounted on the respective arm to move along the longitudinal axis of the arm.

5. An aircraft, comprising:
a frame having a yaw axis and a plurality of arms extending radially outward relative to the yaw axis, at least arm one of the plurality of arms operative to adjust a length of the arm along a longitudinal axis of the arm, at least one arm of the plurality of arms comprises multiple articulated segments coupled together at respective joints that enable movement of each articulated segment only in a rotational plane that is orthogonal to the yaw axis;
a plurality of thrust generators, at least one thrust generator mounted on a respective arm of the plurality of arms; and
a control system coupled to the at least one arm of the plurality of arms and to the plurality of thrust generators and operative to control the operation of the plurality of thrust generators and to control adjustment of the length of the at least one arm of the plurality of arms in flight and on the ground while maintaining directional control of the aircraft in flight and on the ground, and the control system is coupled to the multiple articulated segments and operative to control enable movement of the articulated segments relative to one another in flight and on the ground while maintaining directional control of the aircraft in flight and on the ground.

6. The aircraft of claim 5 wherein at least one of the thrust generators is mounted on the respective arm to be repositionable and to move along the longitudinal axis of the arm in flight of the aircraft, and the control system is operative to control movement of the at least one thrust generator along the respective arm in flight and on the ground while maintaining directional control of the aircraft in flight and on the ground.

7. The aircraft of claim 5, wherein the at least one thrust generator is repositionably mounted on the respective arm.

8. An aircraft, comprising:
a frame having a yaw axis and a plurality of arms extending radially outward relative to the yaw axis, each arm having a longitudinal axis of the arm, and at least one arm including an articulated joint and operative to move about the articulated joint about a pivot axis rotationally in only a two-dimensional rotational plane orthogonal to the yaw axis;
a plurality of thrust generators, at least one thrust generator mounted on a respective arm of the plurality of arms; and
a control system coupled to the at least one arm and to the plurality of thrust generators and operative to control the movement of the at least one arm about the articulated joint in flight and on the ground while maintaining stability and controllability of the aircraft in flight and on the ground.

9. The aircraft of claim 8 further wherein at least one arm of the plurality of arms is operative to adjust a length of the arm along a longitudinal axis the control system is coupled to the at least one arm that is operative to adjust a length, the control system operative to control adjustment in the length of the at least one arm in flight while maintaining directional control of the aircraft.

10. The aircraft of claim 8 wherein at least one of the thrust generators is mounted on the respective arm to be repositionable and move along the longitudinal axis of the arm, and the control system is operative to control movement of the at least one thrust generator along the respective arm in flight while maintaining directional control of the aircraft.

11. The aircraft of claim 8, wherein the at least one thrust generator is repositionably mounted on the respective arm.

12. An aircraft, comprising:
a frame having a yaw axis and a plurality of arms, each arm having a longitudinal axis extending radially outward relative to the yaw axis, at least one arm of the plurality of arms operative to move rotationally in only a two-dimensional rotational plane orthogonal to the yaw axis to adjust an angle between the at least one arm and at least one other arm of the plurality of arms only in the rotational plane;
a plurality of thrust generators, at least one thrust generator mounted on a respective arm of the plurality of arms; and
a control system coupled to the at least one arm of the plurality of arms and to the plurality of thrust generators and operative to control the operation of the plurality of thrust generators and to control adjustment of the angle between the at least one arm and the at least one other arm in flight and on the ground while maintaining directional control of the aircraft in flight and on the ground.

13. The aircraft of claim 12 further wherein at least one arm of the plurality of arms comprises multiple articulated segments coupled together at respective joints that enable movement of each articulated segment only in the rotational plane and the control system is coupled to the multiple articulated segments and operative to control movement of the articulated segments in flight while maintaining directional control of the aircraft.

14. The aircraft of claim 12 wherein the at least one thrust generator is repositionably mounted on the respective arm to move along the longitudinal axis of the arm.

15. The aircraft of claim 12 wherein each arm has a longitudinal axis, and a first arm of the plurality of arms is operative to enable adjustment of a length of the first arm along the longitudinal axis.

16. An aircraft, comprising:
a frame having a yaw axis and a plurality of arms mounted thereon to extend radially outward relative to the yaw axis, each arm having a longitudinal axis;
a plurality of thrust generators, at least one thrust generator mounted on a respective arm of the plurality of arms and operative to be repositionable along the longitudinal axis of the respective arm on which it is mounted; and
a control system coupled to the at least one arm of the plurality of arms and to the plurality of thrust generators and operative to control the operation of the plurality of thrust generators and to control repositioning of the at least one thrust generator along the longitudinal axis of the at least one arm in flight and on the ground while maintaining directional control of the aircraft in flight and on the ground wherein at least one arm of the plurality of arms is coupled to the frame to extend radially outward relative to the yaw axis and to move relative to the frame only in a rotational plane orthogonal to the yaw axis to adjust an angle between the at least one arm and at least one other arm of the plurality of arms only in the rotational plane, and wherein the control system is coupled to the at least one arm of the plurality of arms and to control adjustment of the angle phi between the at least one arm and the at least one other arm in flight and on the ground while maintaining directional control of the aircraft in flight and on the ground.

17. The aircraft of claim 16 wherein a first arm of the plurality of arms is operative to enable adjustment of a length of the first arm along the longitudinal axis and the control system is operative to control the adjustment in the length of the first arm in flight and on the ground while maintaining directional control of the aircraft in flight and on the ground.

18. The aircraft of claim 16 wherein at least one arm of the plurality of arms comprises multiple articulated segments coupled together at respective joints that enable movement of each articulated segment only in a rotational plane that is orthogonal to the yaw axis, and the control system is operative to enable movement of the articulated segments relative to one another in flight and on the ground while maintaining directional control of the aircraft in flight and on the ground.

* * * * *